L. CUNNINGHAM.
CLOD PULVERIZER.
APPLICATION FILED FEB. 19, 1912.

1,041,036.

Patented Oct. 15, 1912.

WITNESSES
E. Cozzens.
E. W. Myers.

INVENTOR
Luther Cunningham
BY
F. C. Bates
HIS ATTORNEY

UNITED STATES PATENT OFFICE.

LUTHER CUNNINGHAM, OF MORGAN HILL, CALIFORNIA.

CLOD-PULVERIZER.

1,041,036.   Specification of Letters Patent.   Patented Oct. 15, 1912.

Application filed February 19, 1912. Serial No. 678,451.

*To all whom it may concern:*

Be it known that I, LUTHER CUNNINGHAM, a citizen of the United States, residing at Morgan Hill, in the county of Santa Clara and State of California, have invented a new and useful Improvement in Clod-Pulverizers, of which the following is a specification.

My invention relates to an improvement in a clod pulverizer, for the purpose of pulverizing the clods in orchards and fields or in any other place where the ground is lumpy, and it becomes necessary to break up the same.

Figure 1:
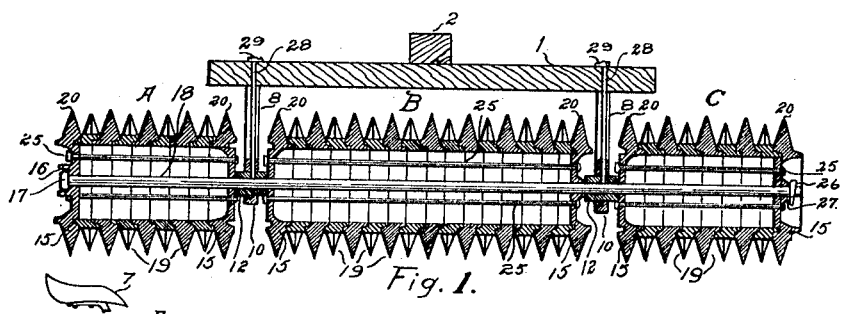
Figure 2:
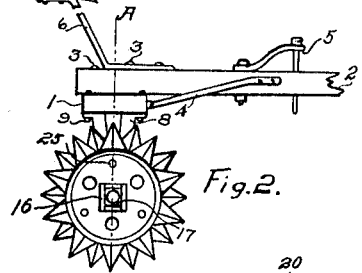
Figure 3:
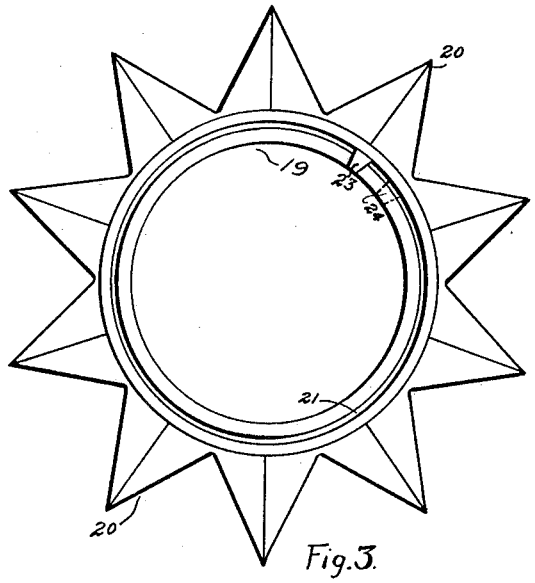
Figures 4, 5:
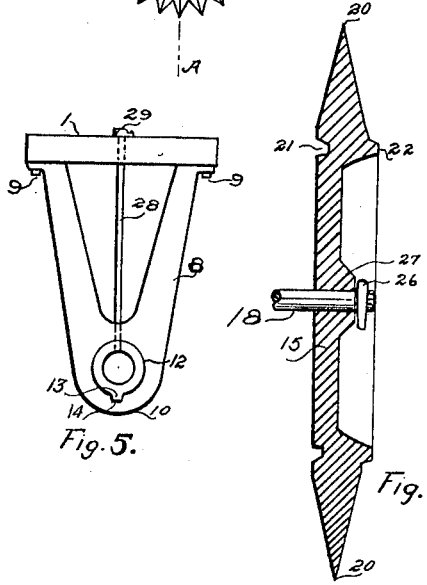

The objects of my invention are, 1st, to construct a clod pulverizer which will break up the clods in a suitable manner and to the fineness which may be required; 2, to construct a clod pulverizer so all parts thereof can be duplicated, and one in which the bearings are interchangeable and can be oiled from the driver's seat without stopping; 3, to construct a clod pulverizer which can be operated close to a tree or vine without injury to the same. I attain these objects by means of the parts illustrated in the accompanying drawings, in which;

Figure 1 is a sectional view on lines A—A Fig. 2. Fig. 2 is an end view of the head of section A, showing the means of connecting the axle thereto. Fig. 3 is a detail view of the drum castings of which the sections are made up. Fig. 4 is a detail view of the outer end of section C, showing means of holding axle in place. Fig. 5 is a side view of the stanchions in which the bearings are located, showing oil pipe leading thereto.

My invention consists of a main frame 1, made of wood or any other suitable material of the proper strength and durability, to which is fastened pole 2, by bolts 3, the same extending out forward a distance and braced by iron braces shown at 4. On pole 2, is fastening 5, to which whiffletrees may be attached. On pole 2, over main frame 1, is fastened angle steel spring 6, made of flat steel the proper width and thickness to sustain the weight put on the same; at the top part of spring 6, is fastened operator's seat 7; this seat may be made of any suitable material and any design required. Near each end of frame 1, on the under side thereof are stanchions 8, fastened to frame 1, by bolts shown at 9. These stanchions are made of cast iron or any other suitable material and are at the top the width of frame 1, having the required thickness, and taper down each way toward the center a distance to a rounding point, as shown at 10. Through this rounding point is a hole into which is placed bearings 12, on the under side of bearings 12, is a small boss 13, which slides into a niche 14, at the lower side of stanchions 8, and when the bearings are in place, this niche keeps the bearings 12, from turning. These bearings 12, are interchangeable, and are made of any suitable material required.

The clod pulverizer rollers are made up in sections as shown at A—B—C—, of any size or length required. The end sections A—C, are shorter than the middle section B; this is for the purpose of giving a longer length to frame 1, and equalizing the weight on the clod pulverizer. The outer ends of sections A—B—C, shown at 15, is made of cast iron or any other suitable metal having spear points at their outer circumference shown at 20. Near the center of outer casting 15, of section A, is a square socket 16, into which the square head 17, on one end of axle 18, is placed; this causes the axle to revolve with sections A—B—C—, while being only fastened to section A, and allows each section to work independent of any of the other sections, which reduces the side draft on the horses' necks. These sections A—B—C, are made up of narrow circular castings 19, as shown at Fig. 3, having spear points on their outer circumference as shown at 20. These spear points are sharp at the points, and have four cutting edges for the purpose of readily breaking up the clods. One side of casting 19, has a concave as shown at 21, and a convex shown at 22, on the other side. On the concave side is a boss 23, which fits into a niche 24, in the convex side of the next casting 19; this locks the castings 19 together in sections A—B—C, when bolted together by bolts shown at 25. The axle 18, is then put in place through sections A—B—C, and bearings 12, and is held in place by key 26, being driven through the end of axle 18; the same having its bearing against hub 27, on the outside of section C. Bearings 12, are oiled through pipes shown at 28, leading from the upper side of frame 1, to the same, these pipes have a cap 29, at the top thereof for the purpose of keeping out any accumulation of dirt.

Although hereinbefore described as being peculiarly adapted for use in pulverizing clods, I do not confine myself to this use alone, as it is manifest that the apparatus may by changes of form to suit varying conditions, be adapted for many other purposes.

Having thus described my invention, what I claim as new, and desire to secure by Letters Patent is—

1. In a clod pulverizer the combination of a main frame, a plurality of roller sections, means of fastening said sections together, means of connecting sections A—B—C, to said frame, outer section A having a square socket on the outer end thereof, an axle having a square head to fit said socket, said axle passing through all of said sections, and movable with said outer section, sections B, C, movable upon said axle; interchangeable bearings on said axle held in place by stanchions, substantially as set forth.

2. In a clod pulverizer the combination of a main frame stanchions fastened thereto extending down a distance into which bearings are held, and means of preventing said bearings from turning, a plurality of roller sections connected thereto, an axle passing through said sections, a square head on one end of said axle fitting into a socket on the outer end of said section, a key at the other outer end holding said sections in place, said outer sections being shorter than the middle section.

3. In a clod pulverizer the combination of a main frame, stanchions fastened thereto extending downward a distance in which bearings are held, means for preventing said bearings from turning, an axle passing through said bearings, a square head on one end of said axle, a key at the other outer end of said axle, a plurality of roller sections connected thereto, a square socket on the outer end of one of said sections, means for fastening said sections together, as shown and described.

In witness whereof I have hereunto set my hand this 12th day of February, 1912.

LUTHER CUNNINGHAM.

Witnesses:
H. J. B. WRIGHT,
J. B. CAMBERS.

---

Copies of this patent may be obtained for five cents each, by addressing the "Commissioner of Patents, Washington, D. C."